United States Patent [19]

Phillips et al.

[11] 4,282,332

[45] Aug. 4, 1981

[54] POLYOLS DERIVED FROM 4,4,4-TRICHLORO-1,2-EPOXYBUTANE AND/OR EPIHALOHYDRIN FOR USE IN THE PRODUCTION OF HEAT SEALABLE FOAMS

[75] Inventors: Barry A. Phillips, Slovan; Keith G. Spitler, Bethel Park, both of Pa.; Richard E. Keegan, New Martinsville, W. Va.

[73] Assignee: Mobay Chemical Corporation, Pittsburgh, Pa.

[21] Appl. No.: 146,983

[22] Filed: May 5, 1980

Related U.S. Application Data

[62] Division of Ser. No. 8,147, Jan. 31, 1979.

[51] Int. Cl.$^3$ ............................................. C08G 18/14
[52] U.S. Cl. .................................... 521/171; 568/614
[58] Field of Search ......................................... 521/171

[56] References Cited

U.S. PATENT DOCUMENTS

| | | | |
|---|---|---|---|
| 3,244,754 | 4/1966 | Bruson et al. | 521/171 |
| 3,269,961 | 8/1966 | Bruson et al. | 521/171 |
| 3,361,831 | 1/1968 | Brunelle et al. | 568/614 |
| 3,402,169 | 9/1968 | Jackson | 568/614 |
| 3,980,579 | 9/1976 | Syrop et al. | 521/171 |
| 4,008,188 | 2/1977 | Alexander | 521/171 |
| 4,020,024 | 4/1977 | Walraevens et al. | 521/171 |

Primary Examiner—Maurice J. Welsh
Attorney, Agent, or Firm—Gene Harsh; Joseph C. Gil

[57] ABSTRACT

The instant invention is directed to a polyol having a molecular weight of 2,000 to 8,000 which is especially suited for use in the production of heat sealable foams, comprising the adduct obtained by sequentially reacting:

(a) a polyhydroxyl initiator, with a functionality of 2 to 5 and a weight average molecular weight as determined by gel permeation chromatography of from 62 to 200; with (b) 10 to 90%, by weight, based on the total oxide present in (b)+(c)+(d), a first alkylene oxide; and subsequently reacting the product with (c) 10 to 80%, by weight, based on the total oxide present in (b)+(c)+(d), 4,4,4-trichloro-1,2-epoxybutane and/or epihalohydrin; and subsequently reacting the product with (d) 10 to 60%, by weight, based on the total oxide present in (b)+(c)+(d), a second alkylene oxide.

8 Claims, No Drawings

POLYOLS DERIVED FROM 4,4,4-TRICHLORO-1,2-EPOXYBUTANE AND/OR EPIHALOHYDRIN FOR USE IN THE PRODUCTION OF HEAT SEALABLE FOAMS

This is a division of application Ser. No. 008,147, filed Jan. 31, 1979.

BACKGROUND OF THE INVENTION

The instant invention is directed to polyols derived from 4,4,4-trichloro-1,2-epoxybutane and/or epihalohydrin which are especially suited for use in preparing foams which may be heat sealed, for example dielectrically. The polyol is formed by alkoxylating an initiator, then reacting the product with 4,4,4-trichloro-1,2-epoxybutane (hereafter referred to as "TCBO") and/or an epihalohydrin, and subsequently capping with a second alkylene oxide.

U.S. Pat. No. 3,244,754 discloses a process wherein a halogen-containing epoxide, which includes TCBO, is reacted with a monomeric polyhydric alcohol in the presence of a Lewis acid. Ethylene glycol and glycerol appear to be the preferred polyhydric alcohols. A divisional of this disclosure, U.S. Pat. No. 3,269,961, is directed to the use of these polyols in the production of polyurethane foams. U.S. Pat. Nos. 3,850,856; 3,219,634; 2,599,799; or 3,081,354 disclose the preparation of polyols by polymerizing an epihalohydrin in the presence of ethylene glycol or other polyoxyalkylene glycols.

U.S. Pat. No. 3,402,169 discloses a process for preparing polyhalogenous polyhydroxy ethers. In one embodiment an initiating compound may be reacted sequentially with two alkylene oxides (column 3, lines 35-38), forming a "block" type polymer. The preferred embodiment, however, appears to be a random mixture of polyhalogenous and nonhalogenous alkylene oxides. The preferred initiating compound is trimethylolpropane, although condensates of alkylene oxides with polyhydric alcohols are disclosed (column 6, lines 11-14). The preferred first alkylene oxide is 1,1,1-trichloro-2,3-epoxy-propane, although TCBO is used in Example 54. The preferred second alkylene oxide is propylene oxide. U.S. Pat. Nos. 3,102,893 (Example 2) and 3,258,495 (Examples 6, 9 and 17) disclose reacting an alcohol with an epoxyalkane and subsequently with epichlorohydrin. U.S. Pat. Nos. 3,415,902 and 3,576,906 disclose epihalohydrin polymers prepared by simultaneously reacting a polyfunctional initiator, epihalohydrin, and an alkylene oxide, preferably propylene oxide.

U.S. Pat. No. 3,741,921 discloses a process for preparing a polyurethane foam wherein the polyol component is the reaction product of TCBO and a sucrose-based or dextrose-based material. The sucrose-based or dextrose-based material includes an oxyalkylated mixture of dextrose or sucrose, and water and/or a polyhydric alcohol. In Example 7 propylene oxide and TCBO are simultaneously added to an alkoxylated initiator. Since the propylene oxide is more reactive than TCBO, the end groups are predominantly TCBO.

U.S. Pat. No. 3,847,844 suggests reacting alkylene oxide with polyhydroxy initiator, before, concurrently with, or after the addition of TCBO (column 4, lines 3-9).

TCBO is used in the polyols of the cited refrences as a flame retardant. The references discussed do not disclose the use of TCBO or an epihalohydrin in preparing foams which may be dielectrically heat sealed.

It is often commercially desirable to emboss foams, binding a portion of the foam to itself, or to bond foams to substrates. One example is in binding furniture foam cushions or automobile seat foams to upholstery covers. This has traditionally been accomplished by stitching the material to the foam. However, this method is time consuming and expensive. Heat sealing, for example dielectric heat sealing (rotational friction heating induced by radio frequency), provides an economical and faster process of binding the foam and substrate. U.S. Pat. Nos. 3,674,718 and 4,060,439 disclose heat sealable polyurethane foams. The prior art methods used a polyvinylchloride dispersion or cyanoethyl groups to provide polar groups for rotational friction heating. The solids in the dispersions tended to settle or migrate causing irregular sealing characteristics. The use of cyanoethyl groups in the mixtures often resulted in degradation of the polymer before the dielectric heat sealing temperature was reached. The disadvantages of these prior art foams are substantially overcome by using the polyols of the instant invention.

It was found that polyols prepared according to the sequential reactions of initiator+TCBO, initiator+AO+TCBO, initiator+epihalohydrin or initiator+AO+epihalohydrin lacked the necessary reactivity of the terminal alcohol groups to produce foams with good processibility or acceptable compression set. It was further found that polyols prepared according to the sequential reactions of initiator+TCBO+AO or initiator+epihalohydrin+AO led to foams which either had extremely low melt strengths and/or unacceptable compression sets. It was surprisingly found that the block polyols of the instant invention produced foams with excellent melt strength (heat sealability), processing latitude and compression set.

DESCRIPTION OF THE INVENTION

The instant invention is directed to a polyol having a molecular weight of 2,000 to 8,000 comprising the adduct obtained by sequentially reacting:

(a) a polyhydroxyl initiator, with a functionality of 2 to 5 and a weight average molecular weight as determined by gel permeation chromatography of from 62 to 200; with (b) 10 to 90%, by weight, based on the total oxide present in (b)+(c)+(d), a first alkylene oxide; and subsequently reacting the product with (c) 10 to 80%, by weight, based on the total oxide present in (b)+(c)+(d), 4,4,4-trichloro-1,2-epoxybutane and/or epihalohydrin; and subsequently reacting the product with (d) 10 to 60%, by weight, based on the total oxide present in (b)+(c)+(d), a second alkylene oxide.

The instant invention is also directed to the polyurethane foam produced by reacting an organic polyisocyanate with the above polyols.

The polyols of the invention may be represented by the following blocks:

| initiator | alkylene oxide | TCBO and/or epihalo-hydrin | alkylene oxide |
|---|---|---|---|

Any polyhydric alcohol containing 2 to 5 hydroxyl groups may be employed as the initiator. Illustrative polyhydric alcohols include, but are not limited to glycerol, ethylene glycol, propylene glycol, isobutylene glycol, trimethylene glycol, pentaerythritol, hexanetriol, trimethylol propane, trimethylol ethane, 1,2-butanediol, diethylene glycol, triethylene glycol, 2-butene-1,4-diol, 2-butyne-1,4-diol, 3-chloro-1,2-propanediol, 2-chloro-1,3-propanediol, 2,3-butanediol, 1,4-dihydroxy-2-butene, 1,4-dihydroxycyclohexane, 2,2-dimethyl-1,3-propanediol, 2-ethyl-2-butyl-1,3-propanediol, erythritol, polyvinyl alcohol, polyalkyl alcohol, 1,4-dimethylolbenzene, dimethylol xylenes, dimethyloltoluenes, dimethylolnaphthalenes, glycerine monochlorohydrin, 2,2,3,3-tetrachloro-1,4-butanediol, 3,3,3-trichloro-1,2-propylene glycol, 3,3-dichloro-1,2-propanediol, monochlorohydrin of pentaerythritol, monochloro-1,2-propanediol, diglycerol, and condensates of alkylene oxides. The presently preferred initiator is glycerol.

One of the primary considerations in selecting a polyhydroxy initiator is the functionality desired in the product. An examination of the structure of the products obtained confirms the fact that the functionality of the polyol is approximately (some initiator will remain as monomer in any mixture) the same as the functionality of the initiating compound used to prepare it. For example, when a triol is used as the polyhydroxy initiating compound, a trifunctional polyol is obtained as the product. When a tetrol is used as the initiating compound, a tetrahydric ether is obtained. When these polyols are to be used in the preparation of polyurethanes, the degree of functionality directly influences the degree of cross-linking in the polyurethane composition and, consequently, the rigidity and hardness of the product. In general, the greater the degree of cross-linking, the harder and more rigid the product. Consequently, more highly functional polyols are normally preferred when preparing hard, rigid polyurethane products. When softer, more flexible polyurethane foams are desired, less highly functional polyols should be utilized and consequently, less highly functional polyhydroxy initiating compounds should be employed for the preparation of the polyols. The functionality of the initiator in the instant invention is between 2 and 5 since flexible foams are desired. In preparing flexible foams, the initiator should preferably have a weight average molecular weight as determined by gel permeation chromatography of from 62 to 200.

The alkoxylation steps [the sequential addition of components (b), (c) and (d)] can be peformed in a manner known and recognized in the art for alkoxylation reactions. The temperature of the reaction will naturally vary depending upon the reactants employed and amounts thereof, the catalyst, if any, and amount thereof and the reaction time. Generally, however, the reactions are conducted in the temperature range of between about 0° and 200° C., preferably between about 20° and 80° C., although, if desired, the reactions can be conducted at room temperature. The reaction time will also vary depending upon the temperature of the reactions, the reactants and ratio thereof and the catalyst and amount thereof, if any. The reaction time is governed by the feed ratio of the alkylene oxide such as to permit control of the exotherm. Generally, however, a reaction time in the range of between about 2 to 15, preferably 2 to 6, hours is employed for each addition. The reaction mixture is generally allowed to proceed until all of the oxide has reacted. Since this conversion is exothermic, when the temperature drops the conversion is essentially complete. The reaction mixture is normally heated for a short time after the temperature drop to assure complete conversion.

Although the addition reactions may be conducted without catalyst, a Lewis acid catalyst is generally used. Generally, the Lewis acid is employed in an amount from about 0.05 to 3%, by weight, based on the total quantities of reactants. Any Lewis acid may be employed, for example, boron trifluoride etherate, boron trifluoride, boron trichloride, aluminum chloride, titanium tetrachloride, tin tetrachloride, ferric chloride or acidic clays.

The alkylene oxides, other than TCBO and epihalohydrin, used generally correspond to the general formula:

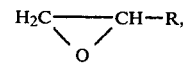

wherein R represents hydrogen, an alkyl group of from one to three carbon atoms, or an alkyl group of from one to three carbon atoms substituted with a phenyl group. Specific examples include ethylene oxide, 1,2-propylene oxide, styrene oxide and 1,2-butylene oxide. The presently preferred materials are ethylene oxide and propylene oxide.

The amount of alkylene oxide used in the first alkoxylation is 10 to 90%, preferably 10 to 50%, by weight, based on the total oxide present in steps (b), (c) and (d). The alkylene oxides (b) and (d) may be the same or different. The amount of 4,4,4-trichloro-1,2-epoxybutane (TCBO) and/or epihalohydrin used in step (c) is 10 to 80%, preferably 20 to 50%, by weight, based on the total oxide present in steps (b), (c) and (d). Although TCBO and epihalohydrin are alkylene oxides, in the instant invention, they are not used as components (b) or (d). The amount of alkylene oxide used in step (d) is 10 to 60%, preferably 10 to 40%, by weight, based on the total oxide present in steps (b), (c) and (d).

Although the molecular weight of the polyol may vary over a wide range, the preferred range is 2,000 to 8,000, preferably 5,500 to 7,000, as determined by gel permeation chromatography.

The polyurethane foams of the invention are prepared by reacting the TCBO and/or epihalohydrin polyols alone or admixed with other polyols, with an organic polyisocyanate in the presence of a reaction catalyst and optionally a foaming agent.

The isocyanates preferably used in the foams of the invention include aliphatic, cycloaliphatic, araliphatic, aromatic and heterocyclic polyisocyanates, such as those described, for example, by W. Siefken in Justus Liebigs Annalen der Chemie, 562, pages 75 to 136. Examples include ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and -1,4-diisocyanate and mixtures of these isomers; 1-isocyanato-3,3,5-trimethyl-5-isocyanatomethylcyclohexane (German Auslegeschrift No. 1,202,785, U.S. Pat. No. 3,401,190); hexahydrotolylene-2,4- and -2,6-diisocyanate and mixtures of these isomers; hexahydrophenylene-1,3- and/or -1,4-diisocyanate; perhydrodiphenylmethane-2,4'- and/or 4,4'-diisocyanate; phenylene-1,3- and -1,4-diisocyanate; tolylene-2,4- and -2,6-diisocyanate and mixtures of these isomers; diphenylmethane-2,4'- and/or -4,4'-diisocyanate; naphthylene-1,5-diisocyanate; triphenylmethane- 4,4',4"-triisocyanate; m- and p-isocyanatophenyl-sulphonylisocyanates as described in U.S. Pat. No. 3,454,606; perchlorinated aryl polyisocyanates, such as the compounds described in U.S. Pat. No. 3,277,138; polyisocyanates containing carbodiimide groups as described in U.S. Pat. No. 3,152,162; the diisocyanates described in U.S. Pat. No. 3,492,330; polyisocyanates containing allophanate groups as described, for example, in British Pat. No. 994,890, Belgian Pat. No. 761,626 and published Dutch Patent Application No. 7,102,524; polyisocyanates containing urethane groups as described in Belgian Pat. No. 752,261 or in U.S. Pat. No. 3,394,164; polyisocyanates containing acylated urea groups as described in German Pat. No. 1,230,778; polyisocyanates containing biuret groups as described in U.S. Pat. Nos. 3,124,605 and 3,201,372 and in British Pat. Nos. 889,050; polyisocyanates prepared by telomerization reactions as described in U.S. Pat. No. 3,644,106; polyisocyanates containing ester groups, such as those described in British Pat. Nos. 965,474 and 1,072,956, in U.S. Pat. No. 3,567,763 and in German Pat. No. 1,231,688; reaction products of the above-mentioned isocyanates with acetals as described in German Pat. No. 1,072,385; and polyisocyanates containing polymeric fatty acid residues as described in U.S. Pat. No. 3,455,883.

As a rule, it is particularly preferred to use readily available polyisocyanates such as tolylene-2,4- and -2,6-diisocyanate and mixtures of these isomers ("TDI").

The foaming agent optionally employed may be any of those known to be useful for this purpose, such as water, the halogenated hydrocarbons and mixtures thereof. Typical halogenated hydrocarbons include, but are not limited to, the following: monofluorotrichloromethane, difluorodichloromethane, 1,1,2-trichloro-1,2,2-trifluoroethane, methylene chloride, chloroform and carbon tetrachloride. The amount of blowing agent employed may be varied within a wide range. Generally, however, the halogenated hydrocarbons are employed in an amount from 0 to 30 parts by weight per 100 parts by weight of the total polyol used in preparing the foam, and generally the water is employed in an amount of from 0 to 10 parts by weight per 100 parts by weight of the total polyol used in preparing the foam.

The polyurethane foams are prepared in the presence of a catalytic amount of a reaction catalyst. The catalyst or mixture of catalysts employed may be any of the catalysts known to be useful for this purpose, including tertiary amines and metallic salts. Typical tertiary amines include, but are not limited to, the following: diethanolamine, bis-dimethylaminopropylether, N-methyl morpholine, N-hydroxyethyl morpholine, triethylene diamine, triethylamine, trimethylamine. Typical metallic salts include, for example, the salt of antimony, tin and iron, e.g. dibutyltin dilaurate, stannous octoate, etc. Generally speaking, the catalyst is employed in an amount from 0.01 to 2.0 percent by weight based on the total polyol used in preparing the foam.

Various additives may be employed in the preparation of the polyurethane foams in order to achieve particular properties. Exemplificative of such additives include, but are not limited to, the following: monocarboxylic acids, polycarboxylic acids, polyesters, monohydroxy compounds, polyhydroxy compounds, etc.

It is preferred in the preparation of the polyurethane compounds of the present invention to employ minor amounts of a surfactant in order to improve the cell structure of the polyurethane foam. Typical of such surfactants are the silicone oils, and soaps. Generally up to 2 parts by weight of the surfactant is employed per 100 parts of total polyol.

Various additives can be employed which serve to provide different properties, e.g., fillers, such as clay, calcium sulfate, or ammonium phosphate may be added to lower cost and improve physical properties. Ingredients such as dyes may be added for color, and fibrous glass, asbestos, or synthetic fibers may be added for strength. In addition, plasticizers, deodorants and antioxidants may be added.

The following examples are provided to illustrate the present invention.

EXAMPLES

EXAMPLE 1

(Glycerol←50% PO←35% TCBO←15% EO)

53.6 g of glycerol and 55 g of $BF_3$-etherate (Lewis acid) were mixed with 500 ml of toluene (solvent). The reaction system was purged with nitrogen to prevent oxidation. The mixture was light brown with a $BF_3$-etherate/glycerol complex material which was insoluble in toluene forming a separate phase. 1724 g of propylene oxide were added to the mixture over a period of 10.5 hours while the system was under two pounds of nitrogen pressure. The temperature was kept below 30° C. with an ice bath. After 30% of propylene oxide was added, the reaction mixture became clear and homogeneous. After heating the reaction mixture at 45° C. for one hour, 50 g of additional $BF_3$-etherate were added to the flask (a total of 3% of batch weight) followed by addition of 1207 g TCBO (4,4,4-trichloro-1,2-epoxybutane). The TCBO was added to the reaction mixture over 5 hours. The temperature was controlled at 35° C. with an ice bath. During the TCBO addition, the reaction mixture slowly darkened to a very dark brown. After an hour post reaction at 50° C., the polyol was cooled to 20° C. and 518 g of ethylene oxide were added over a period of 3 hours and the temperature was held at 28° C. with an ice bath. After 16 hours at 25° C., 46% potassium hydroxide (90 g) was added to the flask. The polyol was heated at 75° C. for one hour and stripped at 90° C. under full vacuum (1 mm Hg). 35 g of magnesium silicate were added to complete the neutralization and the reaction mixture was stripped further at 110° C. for one hour. Filtration gave a brown oil (3443 g, 94.7%): OH No. 28 (theory), Acid No. <0.05,% water

EXAMPLE 2

(Glycerol←49.2% PO← 20.3% TCBO←30.5% PO)

1278 g of a glycerol/propylene oxide adduct with a hydroxyl number of 56 and 29 g of $BF_3$-etherate were mixed and the reaction system was purged with nitrogen. The mixture was placed under two pounds of nitrogen pressure and 548 g of propylene oxide were added slowly with vigorous stirring. The temperature increased slowly and was controlled at 30° C. with an ice bath. The reaction mixture was stirred at 26° C. for 17 hours after the propylene oxide addition was complete. The polyol was stripped at 80° C. under vacuum (1 mm Hg) to remove all volatile materials. 95 g of magnesium silicate were added and the product was stirred at 80° C. for 1.5 hour. Filtration gave a brown oil (1781 g, 97.5%): OH No. 28 (theory), Acid No. 0.02,% Cl 12.4.

EXAMPLE 3

(Glycerol←10% PO←50% TCBO←40% PO)

200 g of toluene, 24.5 g of glycerol and 12 g of BF$_3$-etherate were mixed and the reaction system was purged with nitrogen. The system was placed under two pounds of nitrogen pressure and 150 g of propylene oxide were added over 1.5 hours with vigorous stirring. The temperature was kept below 30° C. with an ice bath. The reaction mixture was allowed to stand at 25° C. for 17 hours. 55 g of BF$_3$-etherate were added to the flask followed by slow addition of 788 g of TCBO. The solution was stirred vigorously and the reaction temperature was controlled at 60° C. with an ice bath. At 55° C. the reaction mixture turned from slighly yellow to black. After the TCBO addition was complete, the temperature was held at 60° C. for 2.5 hours, followed by 17 hours at 25° C. 632 g of propylene oxide were added slowly with vigorous stirring. The temperature was controlled at 35° C. with an ice bath. After the propylene oxide addition, the reaction mixture was kept at 25° C. for 17 hours. The polyol was stripped at 80° C. under vacuum (1 mm Hg) to remove all volatile materials. 80 g of magnesium silicate were added and the product was stirred at 80° C. for two hours. Filtration gave a dark brown oil (1567 g, 97.8%): OH No. 28 (theory), Acid No. <0.01,% Cl 30.00.

EXAMPLE 4

(Glycerol←50% PO←35% EBH←15% EO)

31.1 g of glycerol and 55 g of BF$_3$-etherate were mixed with 300 g of toluene (solvent). The reaction system was purged with nitrogen to prevent oxidation. The mixture was placed under two pounds of nitrogen pressure and 100 g of propylene oxide were added over a period of 6.5 hours. The temperature was kept below 30° C. with an ice bath. 700 g of epibromohydrin were added over 5.5 hours. The temperature was held at 35° C. with an ice bath. The reaction mixture slowly darkened during the addition of epibromohydrin. 300 g of ethylene oxide were then added to the mixture over 3 hours. The temperature was kept below 30° C. with an ice bath. 47.6 g of 46% potassium hydroxide were added and the mixture stirred at 40° C. for 1.5 hours. The polyol was stripped at 80°-110° C. under full vacuum (1 mm Hg) to remove all volatile material. 20 g of magnesium silicate were added and the product was stirred at 80° C. for one hour. Filtration gave a dark brown oil (1881 g, 92.6%): OH No. 28 (theory), Acid No. 4.38,% water 0.19,% Br 20.01.

EXAMPLE 5 (COMPARISON)

(Glycerol←69.4% PO←30.6% TCBO)

2243 g of a glycerol/propylene oxide adduct with a hydroxyl number of 56 were mixed with 25 g of BF$_3$-etherate. The reaction system was purged with nitrogen to prevent oxidation. 9 g of TCBO (4,4,4-trichloro-1,2-epoxybutane) were added dropwise with vigorous stirring. The temperature of the mixture rose and was held at 85° C. with an ice bath during addition. After addition of TCBO the mixture was heated at 90° C. for eight hours. 66 g of 10.9% sodium hydroxide were added and the mixture was stirred for one hour at 90° C. Volatiles were removed by stripping at 85° C. under vacuum (1 mm Hg). 16 g of magnesium silicate were added and the mixture was stirred for two hours at 90° C. Filtration gave a dark brown oil (3100 g, 98.7%): OH No. 40 (theory), Acid No. 2.62, % Cl 16.71.

EXAMPLE 6 (COMPARISON)

(Glycerol←56% EPI←44% PO)

23.6 g of glycerol and 12 g of BF$_3$-etherate were mixed with 100 g of toluene. The reaction system was purged with nitrogen. 840 g of epichlorohydrin were added to the mixture over a period of 6.5 hours under two pounds of nitrogen pressure and with vigorous stirring. The temperature of the reaction mixture increased and was held at 80° C. with an ice bath. 6 g more of BF$_3$-etherate were added to the mixture and the temperature was reduced to 25° C. with an ice bath. 667 g of propylene oxide were added over 7 hours and the temperature was held at 35° C. with an ice bath. After 80% of the propylene oxide had been added, an additional 6 g of BF$_3$-etherate were added. The polyol was heated to 100° C. for one hour and was stripped under full vacuum (1 mm Hg). 75 g of magnesium silicate were added and the reaction mixture was stripped further. Filtration gave a dark brown oil (1408 g, 92% yield): OH No. 28 (theory), Acid No. 0.06, % Cl 22.32. A sample of the polyol taken after stripping but before addition of magnesium silicate gave the following: OH No. 28 (theory), Acid No. 2.54, % Cl 22.56.

EXAMPLE 7 (COMPARISON)

Glycerol←56% TCBO←44% PO)

23.6 g of glycerol and 12 g of BF$_3$-etherate were mixed and the reaction system was purged with nitrogen. 840 g of TCBO were added dropwise with vigorous stirring. The reaction temperature slowly increased and was controlled at 80° C. with an ice bath. Additional BF$_3$-etherate (9 g and 5 g, respectively) was added to the reaction mixture after the TCBO addition was 45% and 83% complete. 134 g of toluene were added and the temperature was maintained at 80° C. for two hours after the TCBO addition. The polyol was allowed to stand at 25° C. for 17 hours. The temperature was lowered to 10° C. and 657 g of propylene oxide were added slowly with vigorous stirring. The reaction temperature was kept below 30° C. with an ice bath. More BF$_3$-etherate (10 g) was added after 50% of the propylene oxide had been introduced. After standing at 25° C. for 17 hours, the polyol was stripped at 100° C. under vacuum (1 mm Hg) to remove all volatile materials. The product was a black oil (1461 g, 96.1%) with an unusually high acid number: OH No. 28 (theory), Acid No. 9.0, % Cl 33.61.

EXAMPLE 7A (COMPARISON)

(Reduction of the acid number)

500 g of the product of Example 7 were stirred for eight hours at 60° C. with 25 g of magnesium silicate. Filtration gave a brown oil (475 g, 95.0%); Acid No. 0.51.

EXAMPLE 7B (COMPARISON)

(Reduction of the acid number)

250 g of the product of Example 7 were dissolved in 200 ml of toluene. The solution was washed successively with two 100 ml portions of 10.9% sodium hydroxide and four 100 ml portions of water. The organic layer was separated and stripped at 60° C. under vacuum with a nitrogen sparge. The product was a brown oil (215 g, 86%): Acid No. 0.06, % H$_2$O 0.035.

EXAMPLES 8–16

The formulations of the foams of Examples 8 through 16 and the dielectric heat sealability test results have been summarized in Table 1. The foams were produced by premixing the polyol in the activators in an air mixer (~2500 RPM) for about 15 seconds. The isocyanate was added and the mixture was further mixed for about 10 seconds. The mixture was then poured into a 12"×12"×6" cardboard box and allowed to foam.

The resulting foams were then tested for melt strength and compression set.

The subject polyurethane foams were placed in a Reevelec Model C6F-S 13–15 MC dielectric heating generator at 160° C. with a pulse time of 10 sec. and a dwell time of an additional 10 sec. In this manner a melt line was established on the foam sample ¼" wide by 2" long. The extent of melting is taken as an indication of the degree of responsiveness of the polyurethane foam matrix to the dielectric field. The extent of melting was measured as a tensile strength on an Instron set at a crosshead speed of 2 inches per minute. Values are reported in pounds per linear inch. Similar responses are also seen at dielectric fields of 27 Mhz at varied pulse, dwell and temperature settings.

The compression set was determined for the foams several months after their preparation. They were tested in accordance with ASTM D-1564 Method B. The values recorded are the percent of the foam which did not recover.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A polyurethane foam produced by the steps comprising reacting:
   (I) an organic polyisocyanate;
   (II) a polyol having a molecular weight of 2,000 to 8,000, comprising the adduct obtained by sequentially reacting:
      (a) a polyhydroxyl initiator having a functionality of 2 to 5 and a weight average molecular weight as determined by gel permeation chromatography of from 62 to 200; with
      (b) 10 to 90%, by weight, based on the total oxide present in (b)+(c)+(d), a first alkylene oxide; and subsequently reacting the product with
      (c) 10 to 80%, by weight, based on the total oxide present in (b)+(c)+(d), 4,4,4-trichloro-1,2-epoxybutane and/or epihalohydrin; and subsequently reacting the product with
      (d) 10 to 60%, by weight, based on the total oxide present in (b)+(c)+(d), a second alkylene oxide which may be the same or different alkylene oxide than component (b);
   (III) catalysts; and optionally
   (IV) foaming agent.

2. The polyurethane foam of claim 1, wherein said alkylene oxide of (b) and (d) is each selected from the group consisting of ethylene oxide, propylene oxide or mixtures thereof.

TABLE 1

| Components | Example 8 | 9 | 10 | 11 | 12 | Comparison 13 | 14 | 15 | 16 |
|---|---|---|---|---|---|---|---|---|---|
| Example 1 polyol | 30 | 50 | — | — | — | — | — | — | — |
| Example 2 polyol | — | — | 50 | — | — | — | — | — | — |
| Example 3 polyol | — | — | — | 50 | — | — | — | — | — |
| Example 4 polyol | — | — | — | — | 50 | — | — | — | — |
| Example 5 polyol | — | — | — | — | — | 30 | 50 | — | — |
| Example 6 polyol | — | — | — | — | — | — | — | 30 | — |
| [1]Example 7B polyol | — | — | — | — | — | — | — | — | 50 |
| [2]Polyether polyol A | 70 | 50 | 20 | 20 | 20 | — | — | — | 50 |
| [3]Polyether polyol B | — | — | 30 | 30 | 30 | 70 | 50 | 70 | — |
| [4]80/20 TDI | 41.3 | 33.8 | 33.7 | 33.7 | 33.7 | 30.1 | 31.6 | 27.6 | 33.8 |
| H$_2$O | 1.8 | 1.48 | 1.86 | 2.2 | 2.2 | 2.0 | 2.0 | 2.0 | 1.65 |
| Diethanol amine | 1.0 | 1.0 | 1.0 | 1.0 | 1.0 | 1.0 | 1.0 | 1.0 | 1.0 |
| [5]Amine catalyst | 0.4 | 0.6 | 0.6 | 0.6 | 0.4 | 0.6 | 0.6 | 0.4 | 0.6 |
| Bis-dimethylamino-propylether | 0.1 | 0.1 | 0.1 | 0.1 | 0.1 | 0.1 | 0.1 | 0.05 | 0.1 |
| Dibutyl tin dilaurate | 0.15 | 0.15 | 0.15 | 0.15 | 0.17 | 0.15 | 0.15 | 0.15 | 0.15 |
| [6]Surfactant A | — | — | 0.5 | 1.0 | — | — | — | 0.8 | 1.0 |
| [7]Surfactant B | 1.0 | 1.0 | — | — | 1.0 | — | — | — | — |
| [8]Surfactant C | — | — | — | — | — | 1.2 | 1.2 | — | — |
| Results | | | | | | | | | |
| [9]Total H$_2$O | 3.15 | 2.5 | 2.5 | 2.5 | 2.5 | — | — | — | 2.5 |
| [10]PSI | 71 | 114 | 114 | 99 | 114 | 43 | 71 | 43 | 97 |
| [11]Compression set (% not recovered) | 29 | 38 | 43 | 49 | 23 | 53 | 81 | 62 | 73 |

[1]Example 7B polyol - The polyol of Examples 7 and 7A would not react with the isocyanate to form a foam.
[2]Polyether polyol A - A 20% polyurea filled polyether polyol w/1.7 pbw H$_2$O. The base polyol has an OH No. of 34 and is a glycerine based polyether triol.
[3]Polyether polyol B - A glycerine based polyether triol with an OH No. of 28 and a high primary hydroxyl content.
[4]80/20 TDI - 80% 2,4- and 20% 2,6-toluene diisocyanate.

[5]Amine catalyst - $\mathrm{N(CH_3)-C_3H_6-N(CH_3)-C_3H_6-N(CH_3)_2}$ and 50% di-propylene glycol

[6]Surfactant A - Goldschmidt surfactant Tegostab ® B2909 which is a polyoxyalkylene dimethylsiloxane.
[7]Surfactant B - Goldschmidt surfactant Tegostab ® B4617 which is a polyoxyalkylene dimethylsiloxane.
[8]Surfactant C - Union Carbide surfactant L5303 dimethylsiloxane.
[9]Total H$_2$O - This is relevant where the formulation contains polyether polyol A which contains water.
[10]PSI - pounds per square inch tensile at melt line.
[11]Compression set - ASTM D-1564 method B; 90% compression without autoclave.

3. The polyurethane foam of claim 1, wherein said polyhydroxyl initiator has a functionality of 3.

4. The polyurethane foam of claim 3, wherein said polyhydroxyl initiator is glycerol.

5. The polyurethane foam of claim 1, wherein said organic polyisocyanate is toluene diisocyanate.

6. The polyurethane foam of claim 1, wherein component (c) is 4,4,4-trichloro-1,2-epoxybutane.

7. The polyurethane foam of claim 1, wherein component (c) is epihalohydrin.

8. The polyurethane foam of claim 1, wherein said polyol has a molecular weight of 5,500 to 7,000.

* * * * *